US009042837B2

(12) United States Patent
Feng (10) Patent No.: US 9,042,837 B2
(45) Date of Patent: May 26, 2015

(54) DEVICE AND METHOD FOR DETECTING CHANNEL STATE (75) Inventor: Lei Feng, Shanghai (CN)

(73) Assignee: KONINKLIJKE PHILIPS N.V., Eindhoven (NL)

(*) Notice: Subject to any disclaimer, the term of this patent is extended or adjusted under 35 U.S.C. 154(b) by 758 days.

(21) Appl. No.: 13/265,404

(22) PCT Filed: Apr. 20, 2010

(86) PCT No.: PCT/IB2010/051716
§ 371 (c)(1),
(2), (4) Date: Oct. 20, 2011

(87) PCT Pub. No.: WO2010/122488
PCT Pub. Date: Oct. 28, 2010

(65) Prior Publication Data
US 2012/0040624 A1    Feb. 16, 2012

(30) Foreign Application Priority Data

Apr. 21, 2009 (CN) .......................... 2009 1 0134569

(51) Int. Cl.
*H04B 17/00* (2006.01)
*H04W 16/14* (2009.01)
(52) U.S. Cl.
CPC ..................................... *H04W 16/14* (2013.01)
(58) Field of Classification Search
USPC .......... 455/67.11, 115.1, 515, 67.13
See application file for complete search history.

(56) References Cited

U.S. PATENT DOCUMENTS

| 5,726,644 | A | 3/1998 | Jednacz et al. |
| 6,377,608 | B1 | 4/2002 | Zyren |
| 6,803,728 | B2 | 10/2004 | Balasubaramaniam et al. |
| 7,006,468 | B1* | 2/2006 | Chen et al. ..................... 370/330 |
| 7,330,698 | B1* | 2/2008 | Bolt et al. ..................... 455/63.1 |
| 8,542,725 | B1* | 9/2013 | Qian et al. ..................... 375/232 |
| 2006/0198459 | A1* | 9/2006 | Fischer et al. ............... 375/267 |
| 2007/0032211 | A1 | 2/2007 | Kopikare et al. |
| 2008/0136663 | A1* | 6/2008 | Courtney et al. ........ 340/825.22 |
| 2009/0046787 | A1* | 2/2009 | Uesugi et al. ................. 375/260 |
| 2009/0232189 | A1* | 9/2009 | Junell et al. ................... 375/137 |
| 2009/0247076 | A1* | 10/2009 | Bartlett et al. .................. 455/20 |
| 2009/0274140 | A1* | 11/2009 | Cordeiro et al. ............. 370/350 |

FOREIGN PATENT DOCUMENTS

| CN | 101101331 A | 1/2008 |
| EP | 1833215 A1 | 12/2007 |

(Continued)

*Primary Examiner* — Dominic E Rego
(74) *Attorney, Agent, or Firm* — Yuliya Mathis (57) ABSTRACT

The present invention proposes a device and method for detecting the channel state. The detecting device first monitors a channel within a predetermined duration so as to receive a plurality of signals transmitted on the channel, and then determines whether part of the plurality of signals possess periodicity. If part of the plurality of signals possesses periodicity, then the detecting device determines that the channel is interfered. Even if there is no or less data traffic over one or more wireless networks which occupy the channel, the detecting device and method provided by the present invention are capable of detecting the existence of the one or more wireless networks, and determine that the channel is interfered, so as to avoid potential interference. In addition, the cost to detect whether a channel is interfered will be reduced effectively by using the detecting device and the detecting method according to embodiments of the present invention.

13 Claims, 9 Drawing Sheets

(56) References Cited

FOREIGN PATENT DOCUMENTS

| | | |
|---|---|---|
| JP | 2003153337 A | 5/2003 |
| JP | 20040177387 A | 6/2004 |
| JP | 20060262403 A | 9/2006 |
| JP | 2009044384 A | 2/2009 |
| WO | 03050560 A1 | 6/2003 |
| WO | 2005112321 A1 | 11/2005 |
| WO | 2007122188 A1 | 11/2007 |

* cited by examiner

DEVICE AND METHOD FOR DETECTING CHANNEL STATE

FIELD OF THE INVENTION

The invention relates to wireless communication technology, especially to a lighting system using wireless communication technology.

BACKGROUND OF THE INVENTION

Wireless connection is becoming a very important connectivity mechanism for lighting control systems due to its ease of deployment, testing, commissioning and use. However, there is no dedicated wireless band for the transmission of lighting control signals in the current lighting control system. The ISM (Industrial, Science and Medical) band at 2.4 GHz is often used by many commercial lighting applications due to its worldwide free license. Besides lighting applications, the 2.4 GHz ISM band is also used by many other applications, e.g. Internet connection, building automation, and personal local area network, which use WiFi™, Bluetooth™ or Zigbee™.

The 2.4 GHz ISM band may be used by various systems at the same time, therefore, when the wireless lighting control system occupies a certain channel of the 2.4 GHz band for wireless transmission of the lighting control signal, other applications, e.g. IEEE802.11 WLAN (Wireless Local Area Network), which occupy the same channel will interfere with the wireless transmission of the lighting control signal. The wireless lighting control system can dynamically switch to a new channel when detecting interferences; however, switching to a new channel may lead to interruption of the lighting control signal transmission, e.g. a temporary pause of the dynamic lighting pattern, thereby jeopardizing a users' visual experience.

Therefore, when the wireless lighting control system starts to transmit a lighting control signal, first a clean channel (i.e. a channel not occupied by other systems) should be selected for the wireless transmission of the lighting control signal. Nowadays, a common approach used to determine whether a channel is interfered or not is to estimate the average signal strength of the signals received on the channel within a predetermined duration. If the estimated average signal strength is lower than a predetermined threshold, then the channel is determined to be clean, and vice versa. However, this approach can only indicate that the channel is clean during the predetermined detection duration.

Taking IEEE802.11 WLAN as the source of interference by way of example, when the above approach is used by the wireless lighting control system to determine whether a channel is interfered, the average received signal strength estimated by the wireless lighting control system will be rather low if there is no or less data traffic over IEEE802.11 WLAN which occupies the channel during the detection duration, so that the channel will be mistakenly judged to be clean and the wireless lighting control system will start the wireless transmission of the lighting control signal on the channel. However, some time later, once there is data traffic over IEEE802.11 WLAN, the wireless transmission of the lighting control signal of the wireless lighting control system on the channel will be interfered.

SUMMARY OF THE INVENTION

It would be advantageous to provide a device and method for detecting the existence of a wireless network when there is no or less data traffic over the wireless network.

Even though a wireless network could be easily detected with the help of the dedicated terminal for the wireless network, e.g. an IEEE 802.11 WLAN could be easily detected with the help of the IEEE 802.11 WLAN terminal, the cost involved in the detection of the existence of the wireless network by the dedicated terminal would be very high. More particularly, in a large scale wireless lighting control system, if each lighting position is equipped with a dedicated terminal based on the IEEE802.11 protocol, the design and deployment of the wireless lighting control system will cost a lot.

In accordance with the IEEE 802.11 standard, when an IEEE 802.11 WLAN is established, the access point (AP) in the WLAN will broadcast beacon frames periodically or quasi-periodically. Thus, when there is no or less data traffic over the IEEE 802.11 WLAN, the detecting device can monitor a channel within a predetermined duration so as to receive a plurality of signals transmitted on the channel and then determine whether part of the plurality of signals possess periodicity so as to determine whether there are periodic beacons on the channel. If there are periodic beacons on the channel, the channel is determined to be occupied by the IEEE 802.11 WLAN, that is, the channel is interfered. More particularly, as for a wireless lighting control system, if the detecting device has determined that the channel is interfered, it can choose another clean channel for the wireless lighting control system to transmit lighting control signals wirelessly.

It is to be noted that the term "periodicity" mentioned in this article includes both "strong periodicity" and "quasi-periodicity". In addition, "periodicity" in this document indicates the periodicity of moments for receiving the wireless signals with certain energy, not the periodicity of moments for receiving specific wireless signals.

It is further to be noted that IEEE 802.11 WLAN is just taken as an example and people skilled in the art can understand that the detecting device and the detecting method according to embodiments of the present invention can also be used to detect the state of a channel (i.e., whether the channel is interfered or not) which is occupied by the network using other wireless transmission technology as long as the network can periodically broadcast signals, e.g. controlling signals like beacon frames. The detecting device and detecting method for detecting another wireless transmission technology and/or corresponding wireless network also fall within the protective scope of the present invention.

Therefore, according to an embodiment of the present invention, there is provided a detecting device for detecting the channel state comprising:

a receiver configured to monitor a channel within a predetermined duration so as to receive a plurality of signals transmitted on the channel;

a determining unit configured to determine whether part of the plurality of signals possesses periodicity so as to determine whether the channel is interfered.

According to another embodiment of the present invention, there is provided a method of detecting the channel state comprising:

monitoring a channel within a predetermined duration so as to receive a plurality of signals transmitted on the channel;

determining whether part of the plurality of signals possess periodicity;

determining that said channel is interfered if said part of said plurality of signals possess periodicity.

The detecting device and the detecting method according to embodiments of the present invention determine whether a channel is interfered by taking advantage of the characteristic that a wireless network, e.g. IEEE 802.11 WLAN, periodically broadcasts signals, e.g. controlling signals like beacon frames. The detecting device and detecting method according to embodiments of the present invention monitor a channel within a predetermined duration so as to receive a plurality of signals transmitted on the channel and then determine whether part of the plurality of signals possess periodicity so as to determine whether the channel is interfered. By contrast, in the background of the invention, whether a channel is interfered or not is determined by the fact whether the average received signal strength on a channel estimated within a predetermined duration is lower than a threshold. Therefore, the detecting device and the detecting method according to embodiments of the present invention can effectively detect the existence of the wireless network even though there is no or less data traffic over the network.

In addition, the cost to detect whether a channel is interfered will be reduced effectively by using the detecting device and the detecting method according to embodiments of the present invention. More particularly, by applying the detecting device and the detecting method to the wireless lighting control system, interference can be avoided when transmitting lighting control signals and the design cost of the wireless lighting control system will be reduced.

These and other aspects of the invention will be apparent from and elucidated with reference to the embodiments described hereinafter.

DESCRIPTION OF THE DRAWINGS

The above and other objects, features and advantages of the present invention will become more apparent from the following detailed description considered in connection with the accompanying drawings, in which.

The same reference numerals are used to denote similar parts throughout the Figures.

DETAILED DESCRIPTION

Hereinafter, the present invention is elaborated by taking for example a wireless lighting control system as the application scenario of the present invention. People skilled in the art can understand that the application scenario of the present invention comprises but is not limited to the wireless lighting control system. The present invention is applicable to any wireless transmission system to detect the state of a channel, that is, whether the channel is interfered, so as to prevent the wireless signal transmission in the wireless transmission system from being interfered.

In addition, hereinafter, the detecting device detects by way of example whether a channel is occupied by one or more IEEE 802.11 WLAN. Without loss of generality, the present invention is also applicable to detect whether a channel is occupied by other wireless networks as long as the wireless network periodically broadcasts signals, e.g. controlling signals like beacon frames.

Descriptions of embodiments of the present invention are provided in detail herein below, in conjunction with the accompanying drawings.

Figure 1:
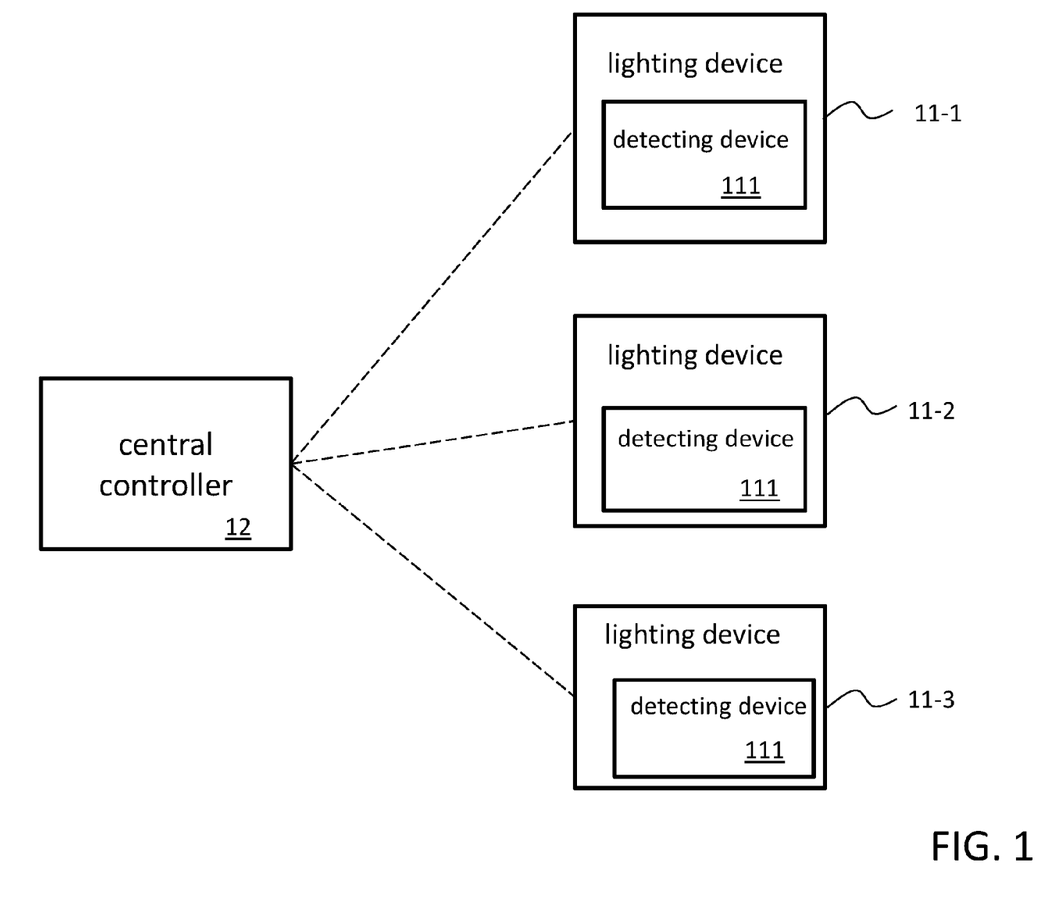
FIG. 1 illustrates an application scenario of a wireless lighting control system according to an embodiment of the present invention.

FIG. 1 illustrates an application scenario of a wireless lighting control system according to an embodiment of the present invention. The wireless lighting control system comprises a central controller 12 and three controlled lighting devices 11-1, 11-2 and 11-3. For the purpose of simplicity, there are only three lighting devices shown in FIG. 1 and people skilled in the art can understand that the number of lighting devices is not limited to three. Each lighting device 11-1, 11-2, 11-3 comprises a detecting device 111. It is to be noted that the detecting device 111 can either be integrated into the controlled lighting devices 11-1, 11-2, 11-3, as illustrated in FIG. 1, or be a separate device from the controlled lighting devices 11-1, 11-2, 11-3.

In the wireless lighting control system as illustrated in FIG. 1, the central controller 12 transmits a lighting signal, e.g. controlling signal, to control one or more of the three controlled lighting devices 11-1, 11-2, 11-3, e.g. switch on, switch off, turn brighter or dimmer. In order to prevent lighting signal transmission, e.g. by controlling the signal transmission of the central controller 12 on a channel so as to prevent it from being interfered by one or more IEEE 802.11 WLAN which also occupy the channel, before the wireless lighting control system transmits a lighting signal, for example, the controlling signal, the detecting device 111 first provides the wireless lighting control system with at least one non-interfered channel, i.e. the channel not occupied by the IEEE 802.11 WLAN, for the central controller 12 to transmit a lighting signal. More specifically, the detecting device 111 first detects the state of a channel, that is, detects whether the channel is interfered; if this is not the case, the detecting device 111 indicates that the channel is available for the wireless lighting control system for the transmission of a lighting signal; but if the channel is interfered, the detecting device 111 detects another channel so as to determine whether it is interfered. The above steps are repeated until at least one noninterfered channel is selected by the wireless lighting control system.

It is to be noted that the wireless transmission protocol used by the wireless lighting control system comprises but is not limited to ZigBee™, Bluetooth™ or other private protocols.

Figure 2:
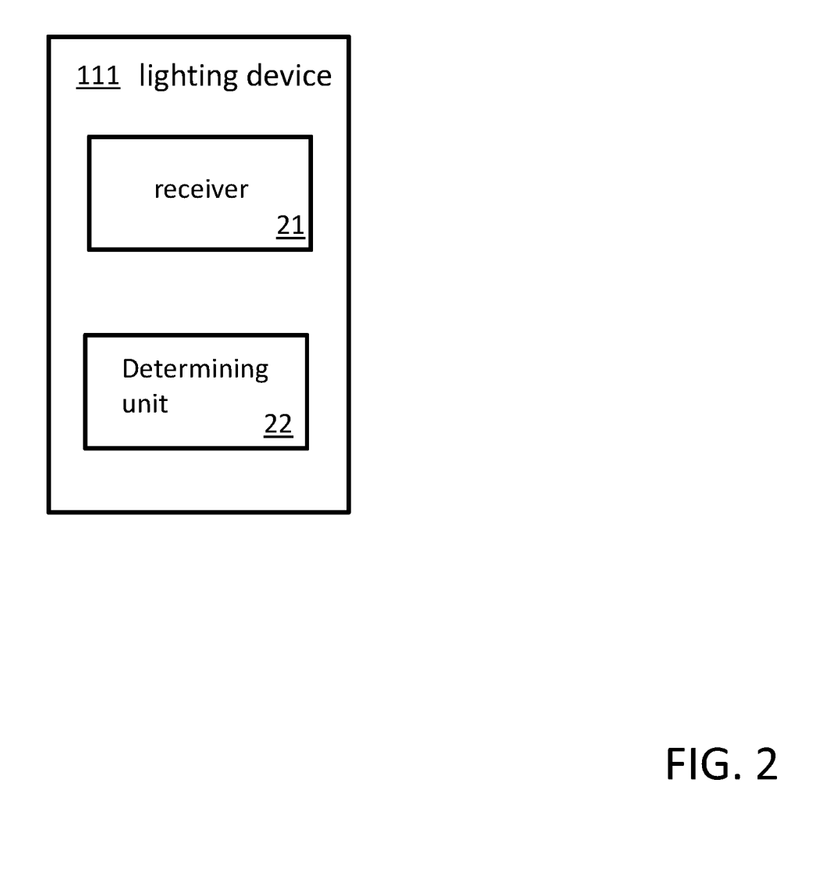
FIG. 2 depicts a block diagram of the detecting device 111 for detecting the channel state according to an embodiment of the present invention.

FIG. 2 depicts a block diagram of the detecting device 111 for detecting the channel state according to an embodiment of the present invention. The detecting device 111 comprises a receiver 21 and a determining unit 22. The detecting device 111 shown in FIG. 2 can be used in the wireless lighting control system in FIG. 1.

Figure 3:
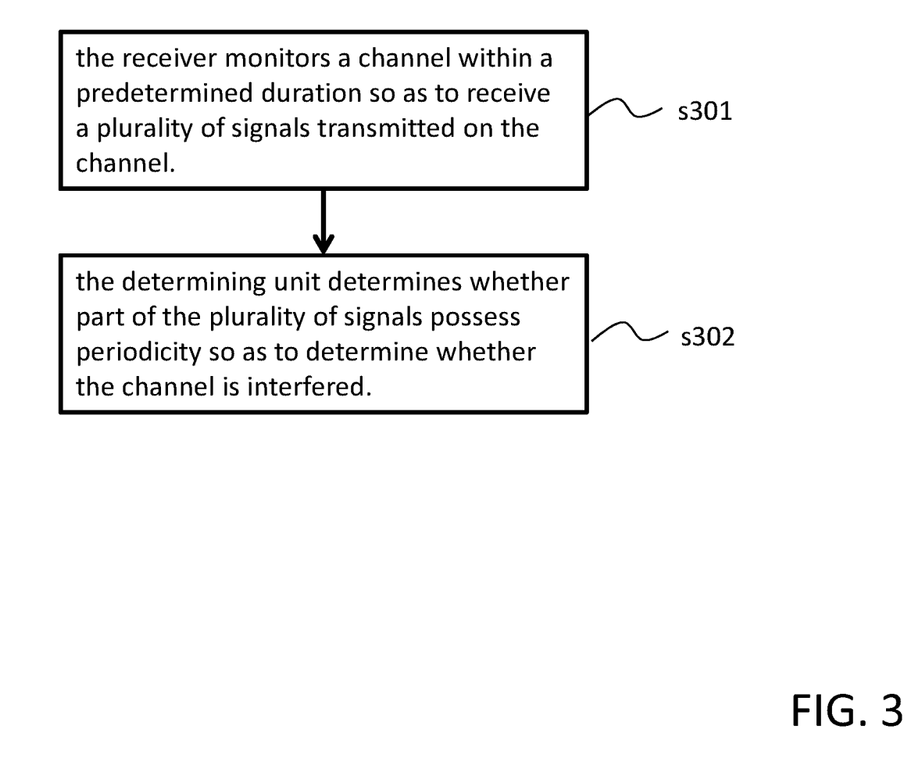
FIG. 3 depicts a flow chart of the method of detecting the channel state according to an embodiment of the present invention.

FIG. 3 depicts a flow chart of the method of detecting the channel state according to an embodiment of the present invention. The detecting method shown in FIG. 3 can be used in the wireless lighting control system in FIG. 1.

The function implemented by the detecting device 111 shown in FIG. 2 will be described in detail with reference to FIG. 3.

First, in step S301, the receiver 21 comprised in the detecting device 111 monitors a channel within a predetermined duration so as to receive a plurality of signals transmitted on the channel.

Alternatively, the receiver 21 monitors the channel with a predetermined sampling frequency within the predetermined duration so as to receive the plurality of signals.

It is to be noted that, in order to sample a plurality of beacon frames periodically transmitted on the channel, the sampling period for the receiver 21 to sample the signal transmitted on the channel should be set to be shorter than the duration of the beacon frames. For example, when the duration of the beacon frames is 2 milliseconds, the sampling period for the receiver 21 to sample the signal transmitted on the channel should be set to be shorter than 2 milliseconds.

Figure 4:
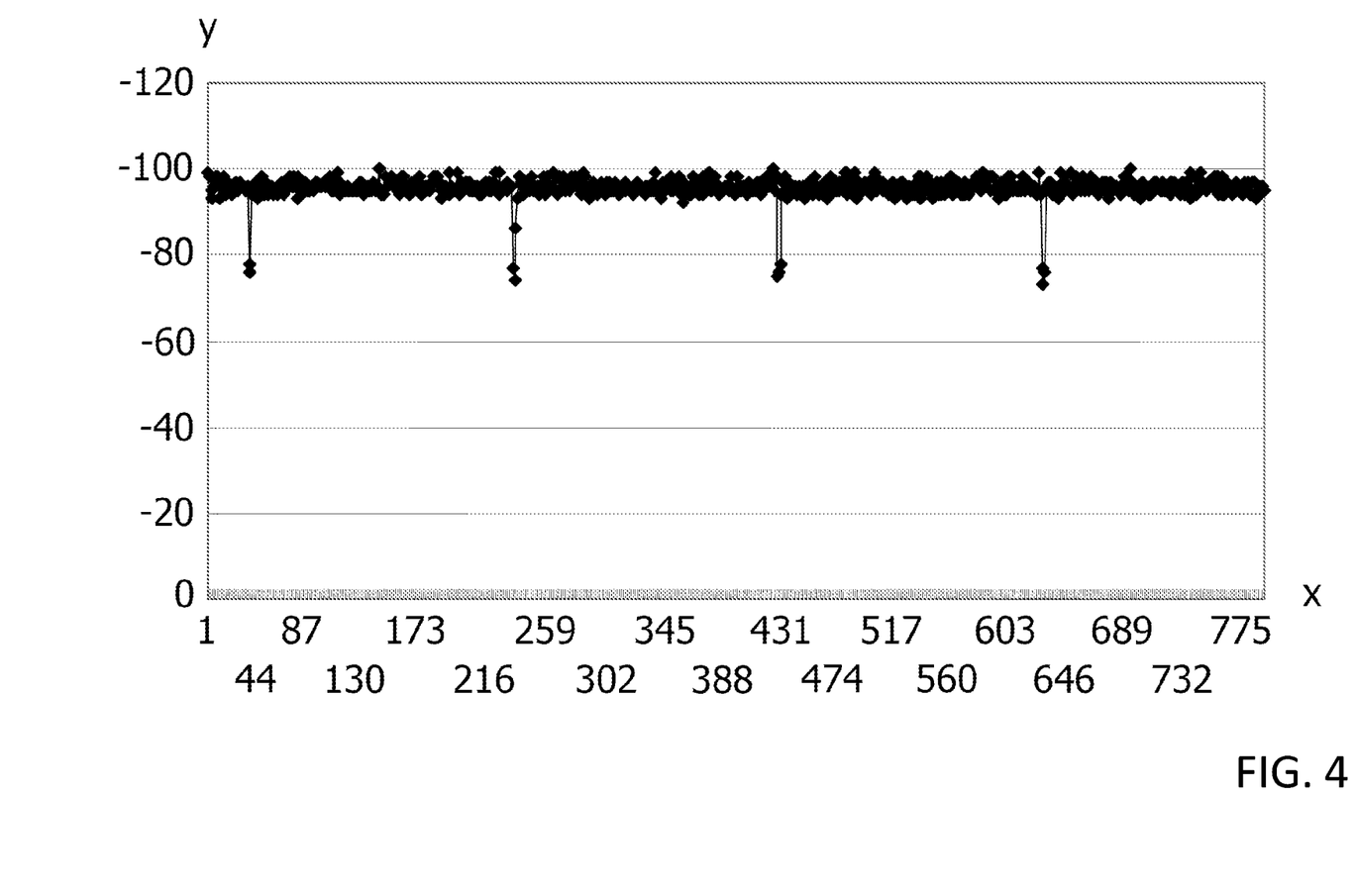
FIG. 4 illustrates a sampling frequency spectrum obtained by monitoring a channel with a predetermined sampling frequency according to an embodiment of the present invention.

FIG. 4 illustrates a sampling frequency spectrum obtained by the receiver 21 after monitoring a channel with a predetermined sampling frequency according to an embodiment of the present invention, wherein the channel is occupied by a IEEE 802.11 WLAN and there is no data transmission in that WLAN. In FIG. 4, x is the horizontal axis that represents the amount of sampling; y is the longitudinal axis that represents the sampling value of the received signal strength (in dBm).

The IEEE 802.11 WLAN broadcasts the beacon frames periodically with an interval of 100 milliseconds, and each beacon frame lasts for 2 milliseconds. The sampling period for the receiver 21 to sample the signals transmitted on the channel is 0.5 milliseconds.

In FIG. 4, the sampling moments which correspond to the plurality of sampling points whose sampling values of the received signal strength are around −80 dBm are the moments for the AP in IEEE 802.11 WLAN to broadcast beacon frames.

After the receiver 21 receives a plurality of signals transmitted on the channel, in step S302, the determining unit 22 comprised in detecting device 111 determines whether part of the plurality of signals possess periodicity so as to determine whether the channel is interfered.

If the determining unit 22 determines that part of the plurality of signals possess periodicity, then the determining unit 22 determines that the channel is interfered.

If the determining unit 22 cannot determine whether part of the plurality of signals possess periodicity, then the determining unit 22 determines that the channel is not interfered.

It is to be noted that "periodicity" here relates to the moments for receiving wireless signals with certain energy, not to the moments for receiving a specific wireless signal.

For example, a channel is occupied by two IEEE 802.11 WLANs, and the APs in these two IEEE 802.11 WLANs broadcast beacon frames on that channel alternately. One IEEE 802.11 WLAN broadcasts the beacon frame A, while the other IEEE 802.11 WLAN broadcasts the beacon frame B. If the plurality of signals received by the receiver 21 comprised in the detecting device 111 are ABABABABAB in 0.5 second, then the determining unit 11 determines that the period is 50 milliseconds instead of 100 milliseconds, which corresponds to the period of beacon frame A or the period of beacon frame B.

Optionally, the determining unit 22 selects a plurality of candidate signals from the plurality of signals according to a predetermined rule, and then the determining unit 22 further determines whether part of the plurality of candidate signals possess periodicity.

It is to be noted that the determining unit 22 can select a plurality of candidate signals one by one from a plurality of signals according to the predetermined rule after the receiver 21 has received the plurality of signals transmitted on the channel within a predetermined duration.

Alternatively, the determining unit 22 can determine whether a signal is a candidate signal according to the predetermined rule, each time the receiver 21 receives the signal on the channel, and such steps are repeated until the determining unit 22 has determined this for the last signal obtained by the receiver 21 within the predetermined duration.

Optionally, the predetermined rule is that the strength of the received signal is larger than a first predetermined threshold.

Alternatively, the predetermined rule is that the difference between the strength of the received signal and the average received signal strength is larger than a second predetermined threshold.

Optionally, the average received signal strength is the average value of the strengths of all currently received signals.

Usually, the first predetermined threshold and the second predetermined threshold are empirical values which relate to the power for the AP in IEEE802.11 WLAN to transmit beacon frames and the distance between the AP and the detecting device 111.

Figure 5:
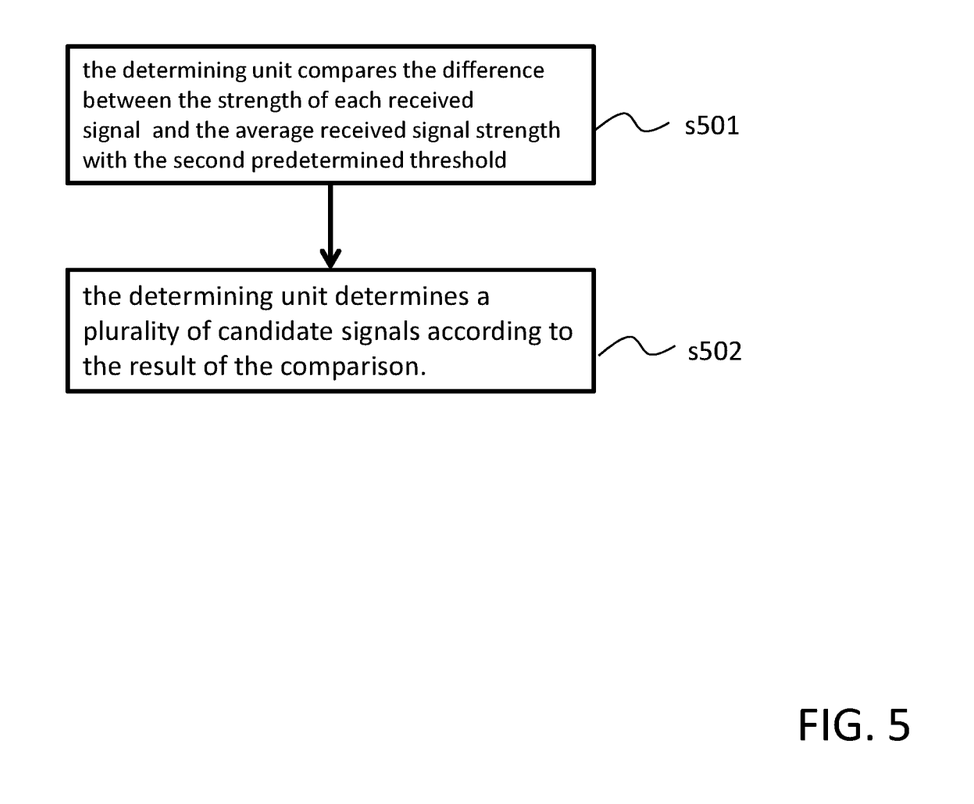
FIG. 5 depicts a flow chart of the method of selecting a plurality of candidate signals according to an embodiment of the present invention.
Figure 6:
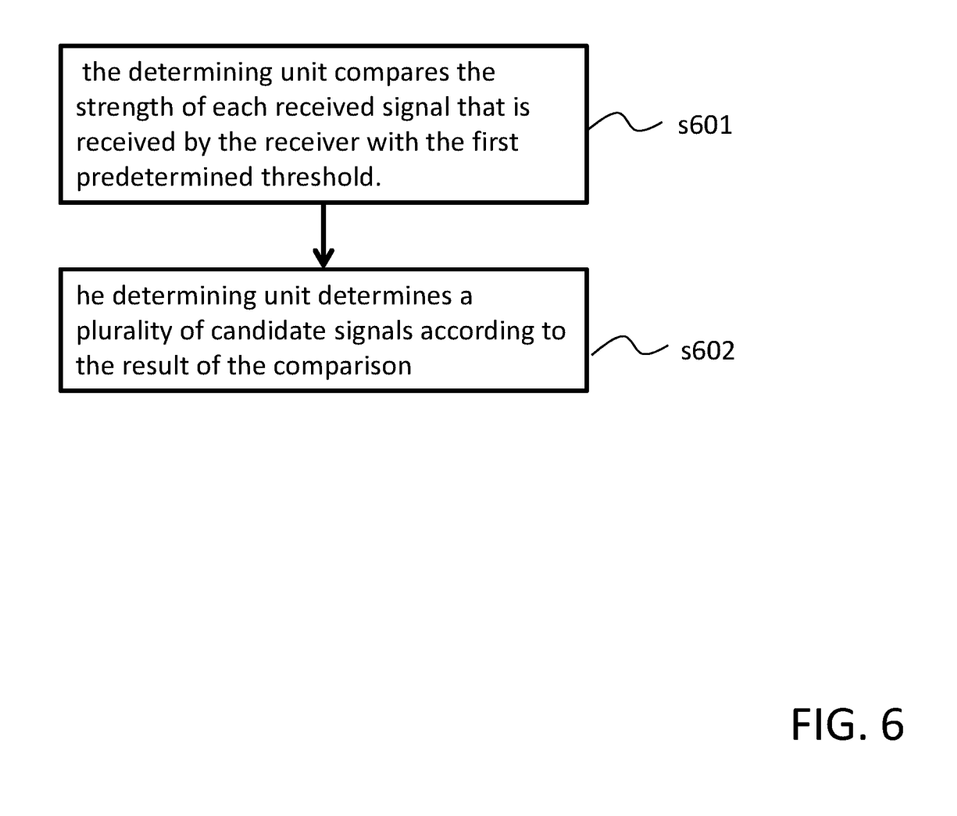
FIG. 6 depicts a flow chart of the method of selecting a plurality of candidate signals according to another embodiment of the present invention.

A detailed description of the determining unit 22 to select a plurality of candidate signals from the plurality of signals received by the receiver 21 in FIG. 2 is given with reference to FIG. 5 and FIG. 6.

FIG. 5 depicts a flowchart of the method of selecting a plurality of candidate signals from the received plurality of signals according to a predetermined rule according to an embodiment of the present invention. The predetermined rule is that the difference between the strength of the received signal and the average received signal strength is larger than a second predetermined threshold.

First, in step S501, the determining unit 22 compares the difference between the strength of each received signal that is received by the receiver 21 and the average received signal strength with the second predetermined threshold.

Optionally, the average received signal strength is the average value of the strengths of all the currently received signals.

Of course, taking into consideration the limited memory of the detecting device 111, alternatively, the average received signal strength is the average value of the strengths of the N received signals prior to the currently received signal, wherein the size of N is determined by the memory of the detecting device 111.

Then, in step S502, the determining unit 22 determines a plurality of candidate signals from the plurality of signals according to the result of the comparison, wherein the difference between each signal of the plurality of candidate signals and the average received signal strength is larger than the second predetermined threshold.

It is to be noted that the determining unit 22 can compare the difference between the strength of each individual signal of a plurality of the received signals and the average received signal strength with the second predetermined threshold and select a plurality of candidate signals from the plurality of the received signals according to the result of the comparison after the receiver 21 receives a plurality of signals transmitted on the channel within a predetermined duration.

Alternatively, the determining unit 22 can compare the difference between the strength of a received signal and the average received signal strength with the second predetermined threshold to determine whether the signal is a candidate signal, each time the receiver 21 receives the signal on the channel, and such steps are repeated until the determining unit 22 has determined this for the last signal received by the receiver 21 within the predetermined duration.

The second situation will be elaborated hereinafter.

More specifically, when the receiver 21 receives a signal transmitted on the channel, first, the receiver 21 stores the strength of the received signal in a buffer for the average received signal strength.

Those skilled in the art can understand that, if the memory of the buffer for the average received signal strength is large enough, the receiver 21 can store the strength of each received signal in the buffer for the average received signal strength.

If the memory of the buffer for the average received signal strength is limited, then, before the receiver 21 stores the strength of the currently received signal in the buffer for the average received signal strength, the receiver 21 should move the strength of the earliest received signal out of the buffer for the average received signal strength in order to prevent the buffer for the average received signal strength from overflowing.

Then, the determining unit 22 calculates the average value of the strengths of the plurality of received signals stored in the buffer for the average received signal strength so as to obtain the average received signal strength.

Next, the determining unit 22 subtracts the average received signal strength from the strength of the currently received signal, and compares the difference with the second predetermined threshold for the strength of the received signal. If the difference between the strength of the currently received signal and the average received signal strength is larger than the second predetermined threshold for the strength of the received signal, then the determining unit 22 takes the currently received signal as a candidate signal and stores the strength of the currently received signal and the receiving moment corresponding to the currently received signal in the candidate beacon buffer.

It is to be noted that the receiving moment corresponding to the received signal can be any one of the beginning moment, ending moment or intermediate moment of the received signal. For example, if the beginning moment of the received signal is taken as the receiving moment corresponding to the received signal, then the candidate beacon buffer stores the strengths of all the received signals that satisfy the predetermined rule and the beginning moments of all the received signals that satisfy the predetermined rule.

Then, the receiver 21 determines whether the duration for monitoring the channel has exceeded the predetermined duration. If the duration for the receiver 21 to monitor the channel does not exceed the predetermined duration, then the receiver 21 continues to monitor the channel in order to receive signals on the channel, and stores the strength of the currently received signal in the buffer for the average received signal strength, after which the determining unit 22 repeats the above steps. If the duration for the receiver 21 to monitor the channel exceeds the predetermined duration, then the receiver 21 stops monitoring the channel. Meanwhile, what is stored in the candidate beacon buffer are the strengths and the corresponding receiving moments of the plurality of candidate signals selected by the determining unit 22 from the plurality of signals received by the receiver 21.

Optionally, after the determining unit 22 determines that the strength of the currently received signal satisfies the predetermined rule and subsequently stores the currently received signal in the candidate beacon buffer as a candidate signal, the determining unit 22 continues to determine whether the number of candidate signals currently stored in the candidate beacon buffer is larger than the predetermined maximum number of candidate signals. If the number of candidate signals currently stored in the candidate beacon buffer is larger than the predetermined maximum number of candidate signals, then the determining unit 22 directly determines that the current channel is interfered. If the number of candidate signals currently stored in the candidate beacon buffer is smaller than the predetermined maximum number of candidate signals, then the receiver 21 further determines whether the duration of monitoring the channel has exceeded the predetermined duration.

FIG. 6 depicts a flowchart of the method of selecting a plurality of candidate signals from the plurality of signals already received according to a predetermined rule according to another embodiment of the present invention. The predetermined rule is that the strength of the received signal is larger than a first predetermined threshold.

First, in step S601, the determining unit 22 compares the strength of each received signal that is received by the receiver 21 with the first predetermined threshold.

Then, in step S602, the determining unit 22 determines a plurality of candidate signals from the plurality of signals according to the result of the comparison, wherein each of the plurality of candidate signals is larger than the first predetermined threshold.

It is to be noted that the determining unit 22 can compare the strength of each individual signal of a plurality of received signals with the first predetermined threshold and select a plurality of candidate signals from the plurality of received signals according to the result of the comparison after the receiver 21 receives the plurality of signals transmitted on the channel within a predetermined duration.

Alternatively, the determining unit 22 can compare the strength of a received signal with the first predetermined threshold to determine whether the received signal is a candidate signal, each time the receiver 21 receives the signal on the channel, and such steps are repeated until the determining unit 22 has determined this for the last signal received by the receiver 21 within the predetermined duration.

The second situation will be elaborated hereinafter.

More specifically, when the receiver 21 receives a signal on the channel, first, the determining unit 22 compares the strength of the currently received signal with the first predetermined threshold. If the strength of the currently received signal is larger than the first predetermined threshold, then the determining unit 22 takes the currently received signal as a candidate signal and stores the strength of the currently received signal and the receiving moment corresponding to the currently received signal in the candidate beacon buffer.

Then, the receiver 21 determines whether the duration of the monitoring of the channel has exceeded the predetermined duration. If the duration for the receiver 21 to monitor the channel does not exceed the predetermined duration, then the receiver 21 continues to monitor the channel in order to receive signals on the channel. Then the determining unit 22 continues to determine whether the currently received signal is a candidate signal.

The receiver 21 and the determining unit 22 repeat the above steps, until the duration for the receiver 21 to monitor the channel has exceeded the predetermined duration. Meanwhile, what is stored in the candidate beacon frame buffer are the strengths and the corresponding receiving moments of the plurality of candidate signals selected by the determining unit 22 from the plurality of signals received by the receiver 21.

Optionally, after the determining unit 22 determines that the strength of the currently received signal satisfies the predetermined rule and then stores the currently received signal in the candidate beacon buffer as a candidate signal, the determining unit 22 continues to determine whether the number of candidate signals currently buffered in the candidate beacon buffer is larger than the predetermined maximum number of candidate signals. If the number of candidate signals currently buffered in the candidate beacon buffer is larger than the predetermined maximum number of candidate signals, then the determining unit 22 directly determines that the current channel is interfered. If the number of candidate signals currently buffered in the candidate beacon buffer is smaller than the predetermined maximum number of candidate signals, then the receiver 21 further determines whether the duration of monitoring the channel has exceeded the predetermined duration.

Figure 7:
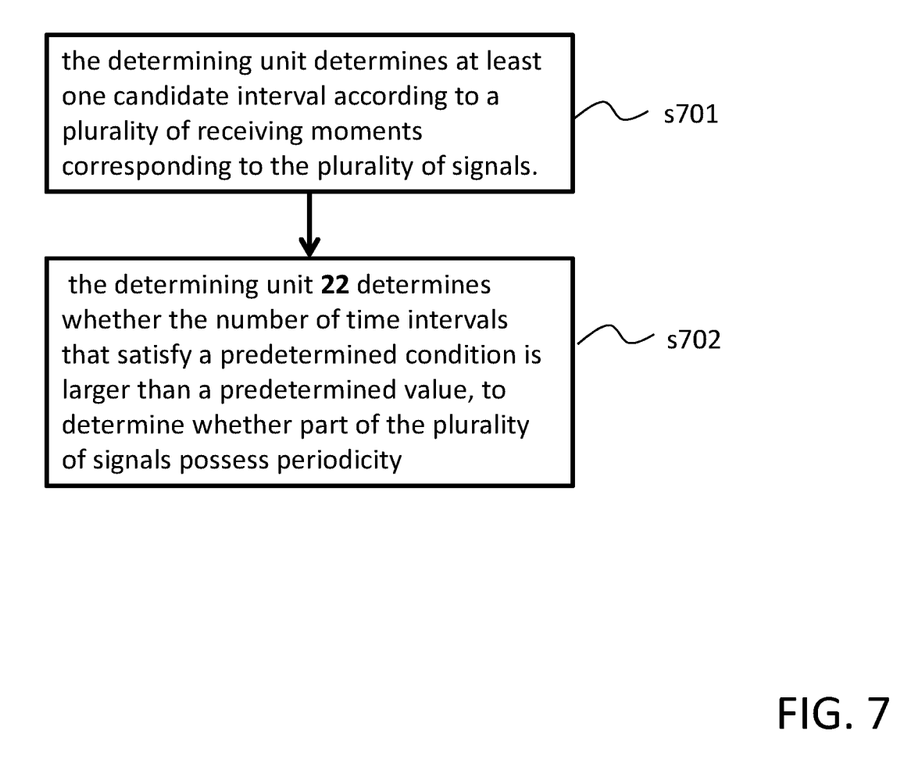
FIG. 7 depicts a flow chart of the method of determining whether part of the plurality of signals possess periodicity according to an embodiment of the present invention.

Hereinafter, the detailed description for the determining unit 22 to determine whether part of the plurality of signals received by the receiver 21 possess periodicity in FIG. 2 is given with reference to FIG. 7. FIG. 7 depicts a flowchart of the method of determining whether part of the plurality of signals possess periodicity according to an embodiment of the present invention.

First, in step S701, the determining unit 22 determines at least one candidate interval according to a plurality of receiving moments corresponding to the plurality of signals.

It is to be noted that the receiving moment corresponding to the received signal can be any one of the beginning moment, ending moment or intermediate moment of the received signal.

Then, in step S702, the determining unit 22 determines whether the number of time intervals that satisfy a predetermined condition in the plurality of receiving moments is larger than a predetermined value according to each of the at least one candidate interval, so as to determine whether part of the plurality of signals possess periodicity, wherein the predetermined condition is that each of the time intervals substantially equals the candidate interval and the distribution of the time intervals on the time axis is continuous and non-overlapping.

If the determining unit 22 determines that the number of time intervals that satisfy a predetermined condition in the plurality of receiving moments is larger than a predetermined value, then determining unit 22 determines that part of the plurality of signals possess periodicity.

If the determining unit 22 determines that the number of time intervals that satisfy a predetermined condition in the plurality of receiving moments is smaller than a predetermined value, then determining unit 22 determines that part of the plurality of signals do not possess periodicity.

Hereinafter, step 702 is explained by assuming for example that the receiver 21 receives 7 signals, and the receiving moments corresponding to the 7 signals are 20 ms, 120 ms, 131 ms, 220 ms, 231 ms, 320 ms and 420 ms.

The determining unit 22 determines that the candidate interval is: 120 ms-20 ms=100 ms.

In the 7 receiving moments, there are four time intervals, i.e. 20~120 ms, 120~220 ms, 220~320 ms and 320~420 ms, which satisfy the predetermined condition. That is to say, the four time intervals are substantially equal to the candidate interval, i.e. 100 ms, and the distribution of the four time intervals on the time axis is continuous and non-overlapping.

It is to be noted that although the size of the time interval 131~231 ms is also equal to the candidate interval (=100 ms), the time interval exhibits an overlap with two of the four time intervals on the time axis, and thus the time interval 131~231 ms does not satisfy the predetermined condition.

It is to be noted that according to the determining method illustrated in FIG. 7, the determining unit 22 directly determines the plurality of signals on the channel received by the receiver 21 so as to determine whether part of the plurality of signals possess periodicity. Those skilled in the art can understand, after the receiver 21 receives the plurality of signals on the channel, optionally the determining unit 22 can first select a plurality of candidate signals from the plurality of signals according to a predetermined rule, and then determine whether part of the plurality of candidate signals possess periodicity.

Figure 8:
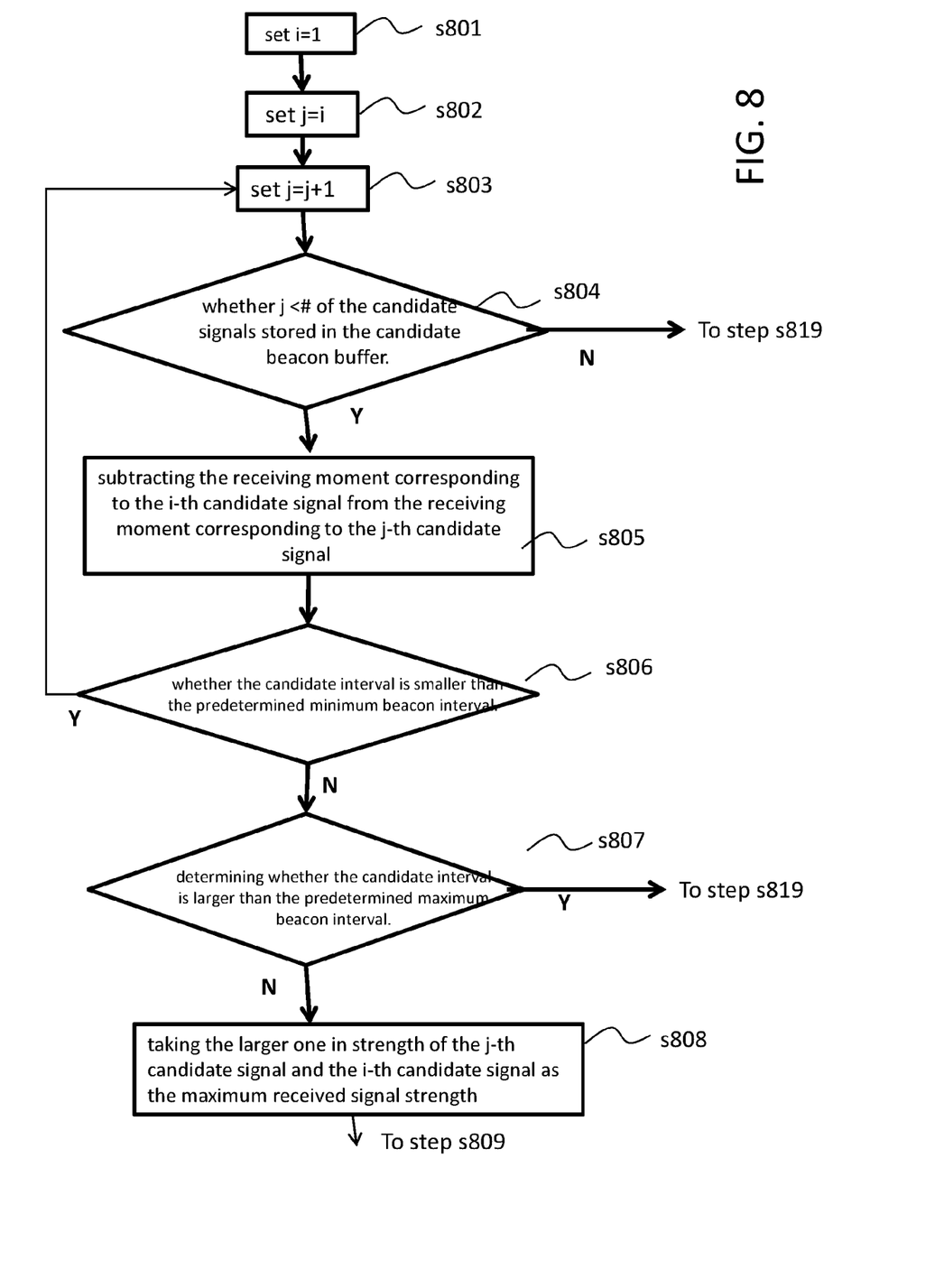
FIG. 8 depicts a flow chart of the algorithm of determining whether part of the plurality of signals possess periodicity according to an embodiment of the present invention.

Hereinafter, a detailed example for the determining unit 22 to determine whether part of the plurality of signals received by the receiver 21 in FIG. 2 possess periodicity is elaborated with reference to FIG. 8.

When the receiver 21 receives a plurality of signals on the channel, the receiver 21 first takes the plurality of signals as candidate signals and stores their strength and corresponding receiving moment in the candidate beacon buffer. Then, the determining unit 22 determines whether part of the plurality of signals possess periodicity according to the strengths of the plurality of signals and the receiving moments corresponding to the plurality of signals stored in the candidate beacon buffer.

As illustrated in FIG. 7, after the receiver 21 has received the plurality of signals on the channel, if the determining unit 22 first selects a plurality of candidate signals from the plurality of signals according to a predetermined rule, then determines whether part of the plurality of candidate signals possess periodicity, then, correspondingly, what is stored in the candidate beacon buffer are the strengths of the plurality of candidate signals and the receiving moments corresponding to the plurality of candidate signals selected by the determining unit 22 from the plurality of signals.

More specifically, first, in step S801, set i=1, that is, i is set to be the index of the first element in the candidate beacon buffer.

Then, in step S802, set j=i, that is, the value of i is assigned to j.

Then, in step S803, set j=j+1, that is, j is set to be the index of the next element in the candidate beacon buffer.

Then, in step S804, it is determined whether j is smaller than the number of the candidate signals stored in the candidate beacon buffer. If no, the method jumps to step S818; if yes, the method goes to step S805, subtracting the receiving moment corresponding to the i-th candidate signal from the receiving moment corresponding to the j-th candidate signal in the candidate beacon buffer, and taking the difference as the candidate interval.

Then, in step S806, it is determined whether the candidate interval is smaller than the predetermined minimum beacon interval. If yes, the method goes back to step S803; if no, the method goes to step S807, determining whether the candidate interval is larger than the predetermined maximum beacon interval.

If the candidate interval is larger than the predetermined maximum beacon interval, the method jumps to step S818; if the candidate interval is smaller than the predetermined maximum beacon interval, the method goes to step S808, taking the larger one in strength of the j-th candidate signal and the i-th candidate signal as the maximum received signal strength, and taking the receiving moment corresponding to the j-th candidate signal as the previous beacon time, and meanwhile setting the number of candidate beacons to 2.

The above steps S801 to S808 are used by the determining unit 22 to determine the candidate interval, and next, starting from step S809, the determining unit 22 determines whether part of the plurality of signals possess periodicity according to the candidate interval.

In step S809, set k=j, that is, the value of j is assigned to k.

Then, in step S810, set k=k+1, that is, the value of k is increased by 1.

Then, in step S811, it is determined whether k is smaller than the number of candidate signals stored in the candidate beacon buffer. If no, the method goes back to step S803; if yes, the method goes to step S812, subtracting the previous beacon time from the receiving moment corresponding to the k-th candidate signal, and taking the difference as the current beacon interval.

Then, in step S813, it is determined whether the current beacon interval is larger than the sum of the candidate interval and the predetermined beacon interval threshold. If yes, then the method goes back to step S803; if no, then the method goes to step S814, determining whether the current beacon interval is substantially equal to the candidate interval. If no, the method goes back to step S810; if yes, the method goes to step S815, taking the receiving moment corresponding to the k-th candidate signal as the previous beacon time, and increasing the number of the candidate beacons by 1, and meanwhile, if the strength of the k-th candidate signal is larger than the maximum received signal strength, the strength of the k-th candidate signal is set as the maximum received signal strength.

Then, the method goes to step S816, it is determined whether the number of candidate signals is larger than the predetermined beacon number threshold. If no, the method goes back to step S810; if yes, the method goes to step S817, taking the current candidate interval and the current maximum received signal strength as beacon-related information. Therefore, the determining unit 22 can determine that the channel is interfered.

If the channel is occupied by a plurality of IEEE 802.11 WLANs, then the determining unit 22 continues to execute the following steps S818 to S819 so as to obtain beacon-related information of each of the IEEE 802.11 WLANs.

Then, the method goes to step S818, set i=1, that is, the value of i is increased by 1.

Then, the method goes to step S819, it is determined whether i is smaller than the number of candidate signals stored in the candidate beacon buffer. If yes, the method goes back to step S802; if no, the whole determination process is terminated.

In view of the above algorithm, the predetermined minimum beacon interval, the predetermined maximum beacon interval, the predetermined beacon interval threshold, the predetermined beacon number threshold can either be read by the user from the configuration files or be input by the user via the operation interface.

It is to be noted that the functions realized by the determining unit 22 in each embodiment of the present invention can also be implemented by a micro-processor that executes the programs with the same functions. More specifically, as to the wireless lighting control system, the functions realized by determining unit 22 can be implemented by the micro-processor, which executes the programs with the same functions, in the wireless lighting control module comprised in each of the lighting devices.

It should be further noted that the aforesaid embodiments are illustrative and not restrictive. The present invention is not limited by the aforesaid embodiments.

It will be apparent to those skilled in the art that various modifications and variations can be made in the present invention without departing from the spirit or scope of the invention. The scope of protection of the invention is not restricted by the reference numerals in the claims; the word "comprising" does not exclude parts other than those mentioned in the claims; the word "a(n)" preceding an element does not exclude a plurality of those elements; means forming part of the invention may be implemented in the form of dedicated hardware or in the form of a programmed processor; the usage of the words first, second and third, et cetera, does not indicate any ordering, these words are to be interpreted as names.

What is claimed is:

1. A detecting device for detecting the channel state, comprising:
   a receiver, configured to monitor a channel within a predetermined duration so as to receive a plurality of signals transmitted on said channel;
   a determining unit, configured to determine whether part of said plurality of signals possess periodicity so as to determine whether said channel is interfered.

2. A detecting device according to claim 1, wherein said receiver is further configured to monitor said channel with a predetermined sampling frequency within said predetermined duration so as to receive said plurality of signals.

3. A detecting device according to claim 1, wherein said determining unit is further configured to select a plurality of candidate signals from said plurality of signals according to a predetermined rule, and to determine whether part of said plurality of candidate signals possess periodicity.

4. A detecting device according to claim 3, wherein said predetermined rule comprises any one of the following items:
   the strength of the received signal is larger than a first predetermined threshold;
   the difference between the strength of the received signal and the average received signal strength is larger than a second predetermined threshold, wherein said average received signal strength is the average value of the strengths of the N currently received signals, wherein N≤M, M being the number of all the currently received signals.

5. A detecting device according to claim 3, wherein, when said predetermined rule states that the difference between the strength of the received signal and the average received signal strength is larger than a second predetermined threshold,
   said determining unit is further configured to compare the difference between the strength of each received signal in said plurality of signals and the average received signal strength with said second predetermined threshold; and
   to determine the plurality of candidate signals from said plurality of signals according to the result of said comparison, wherein the difference between each of said plurality of candidate signals and said average received signal strength is larger than said second predetermined threshold.

6. A detecting device according to claim 1, wherein said determining unit is further configured to
   determine at least one candidate interval according to a plurality of receiving moments corresponding to said plurality of signals; and
   determine whether the number of time intervals that satisfy a predetermined condition in said plurality of receiving moments is larger than a predetermined value according to each of said at least one candidate interval, so as to determine whether part of said plurality of signals possess periodicity, wherein said predetermined condition is that each of said time intervals equals the candidate interval and the distribution of said time intervals on the time axis is continuous and non-overlapping.

7. An illuminating device, comprising a detecting device according to claim 1.

8. A method of detecting the channel state, comprising:
   a. monitoring a channel within a predetermined duration so as to receive a plurality of signals transmitted on said channel;

b. determining whether part of said plurality of signals possess periodicity;
c. determining that said channel is interfered if said part of said plurality of signals possesses periodicity.

9. A method according to claim 8, wherein said step a further comprises:
monitoring said channel with a predetermined sampling frequency within said predetermined duration so as to receive said plurality of signals.

10. A method according to claim 8, wherein said step b further comprises:
b1. selecting a plurality of candidate signals from said plurality of signals according to a predetermined rule;
b2. determining whether part of said plurality of candidate signals possess periodicity.

11. A method according to claim 10, wherein said predetermined rule comprises any one of the following items:
the strength of the received signal is larger than a first predetermined threshold;
the difference between the strength of the received signal and the average received signal strength is larger than a second predetermined threshold, wherein said average received signal strength is the average value of the strengths of the N currently received signals, wherein N≤M, M being the number of all the currently received signals.

12. A method according to claim 10, wherein when said predetermined rule is the difference between the strength of the received signal and the average received signal strength, being larger than a second predetermined threshold, said step b1 further comprises:
i. comparing the difference between the strength of each received signal in said plurality of signals and the average received signal strength with said second predetermined threshold; and
ii. determining the plurality of candidate signals from said plurality of signals according to the result of said comparison, wherein the difference between each of said plurality of candidate signals and said average received signal strength is larger than said second predetermined threshold.

13. A method according to claim 8, wherein said step b further comprises:
I. determining at least one candidate interval according to a plurality of receiving moments corresponding to said plurality of signals; and
II. determining whether the number of time intervals that satisfy a predetermined condition in said plurality of receiving moments is larger than a predetermined value according to each of said at least one candidate interval, wherein said predetermined condition is that each of said time intervals equals the candidate interval and the distribution of said time intervals on the time axis is continuous and non-overlapping;
III. determining that part of said plurality of signals possess periodicity if said number of time intervals that satisfy a predetermined condition in said plurality of receiving moments is larger than a predetermined value.

* * * * *